(12) United States Patent
Abeles

(10) Patent No.: US 7,110,632 B2
(45) Date of Patent: Sep. 19, 2006

(54) CHANNELIZER SWITCH

(75) Inventor: Joseph H. Abeles, Highland Park, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 11/158,894

(22) Filed: Jun. 22, 2005

(65) Prior Publication Data

US 2006/0008272 A1    Jan. 12, 2006

Related U.S. Application Data

(63) Continuation of application No. 10/181,619, filed on Nov. 27, 2002, now abandoned.

(60) Provisional application No. 60/176,915, filed on Jan. 20, 2000.

(51) Int. Cl.
*H04J 14/00* (2006.01)

(52) U.S. Cl. .......................................... 385/15; 398/48
(58) Field of Classification Search .................... None
See application file for complete search history.

(56) References Cited

U.S. PATENT DOCUMENTS

| 4,369,371 A | 1/1983 | Hara et al. |
| 4,696,059 A | 9/1987 | MacDonald et al. |
| 4,799,749 A | 1/1989 | Borner et al. |
| 7,031,561 B1 | 4/2006 | Lim et al. |

*Primary Examiner*—Nikita Wells
*Assistant Examiner*—Zi R. Hashmi
(74) *Attorney, Agent, or Firm*—Lowenstein Sandler PC

(57) ABSTRACT

An RF-photonics integrated communications module including: a plurality of RF input channels; a plurality of modulators each being responsive to one of the RF input channels; and, a plurality of photonic output channels coupled to the modulators via a switching network. The switching network includes a plurality of resonating elements coupled between the modulators and the output channels to selectively apply outputs of the modulators to the output channels.

9 Claims, 5 Drawing Sheets

CHANNELIZER SWITCH

CLAIM FOR PRIORITY

This application is a continuation of U.S. Pat. application No. 10/181,619, filed Nov. 27, 2002, now abandoned, the entire disclosure of which is hereby incorporated by reference herein.

RELATED APPLICATION

This application claims benefit of U.S. provisional patent application Ser. No. 60/176,915, entitled "CHANNELIZER SWITCH" filed Jan. 20, 2000.

FIELD OF INVENTION

The present invention relates generally to RF-photonics integrated communications modules.

BACKGROUND OF INVENTION

Broadband analog or subcarrier multiplexed digital networks with rapid data switching capability, are necessary for commercial telecommunications and for government applications such as communications among the various units in envisioned combat systems using lightweight, agile robotic ground units and unmanned vehicles. The implementation of such capabilities using ordinary electronic switching systems is bulky, slow, and cumbersome. Photonics switching is superior to electronic for handling large data blocks, and has the potential to advantageously offer compact size (integrated on a single chip), low power consumption, and adaptability to low-cost mass fabrication.

Standing in stark contrast to the revolution in digital networks, there presently exists no adequate technology for transmission, grooming, and switching of high-frequency (multi-GHz) RF data. The present invention addresses this need for advanced electronic and optical communications for commercial and for warfare systems.

Accordingly, a premium is now being and in the future is likely to be placed on light-weight and compact and RF and RF-subcarrier multiplexed digital networking components, strongly favoring an RF-photonic solution.

SUMMARY OF INVENTION

An RF-photonics integrated communications module including: a plurality of RF input channels; a plurality of modulators each being responsive to one of the RF input channels; and, a plurality of photonic output channels coupled to the modulators via a switching network; wherein, the switching network comprises a plurality of resonating elements coupled between the modulators and the output channels to selectively apply outputs of the modulators to the output channels.

DETAILED DESCRIPTION OF THE PREFERRED EMBODIMENT

Figure 1:
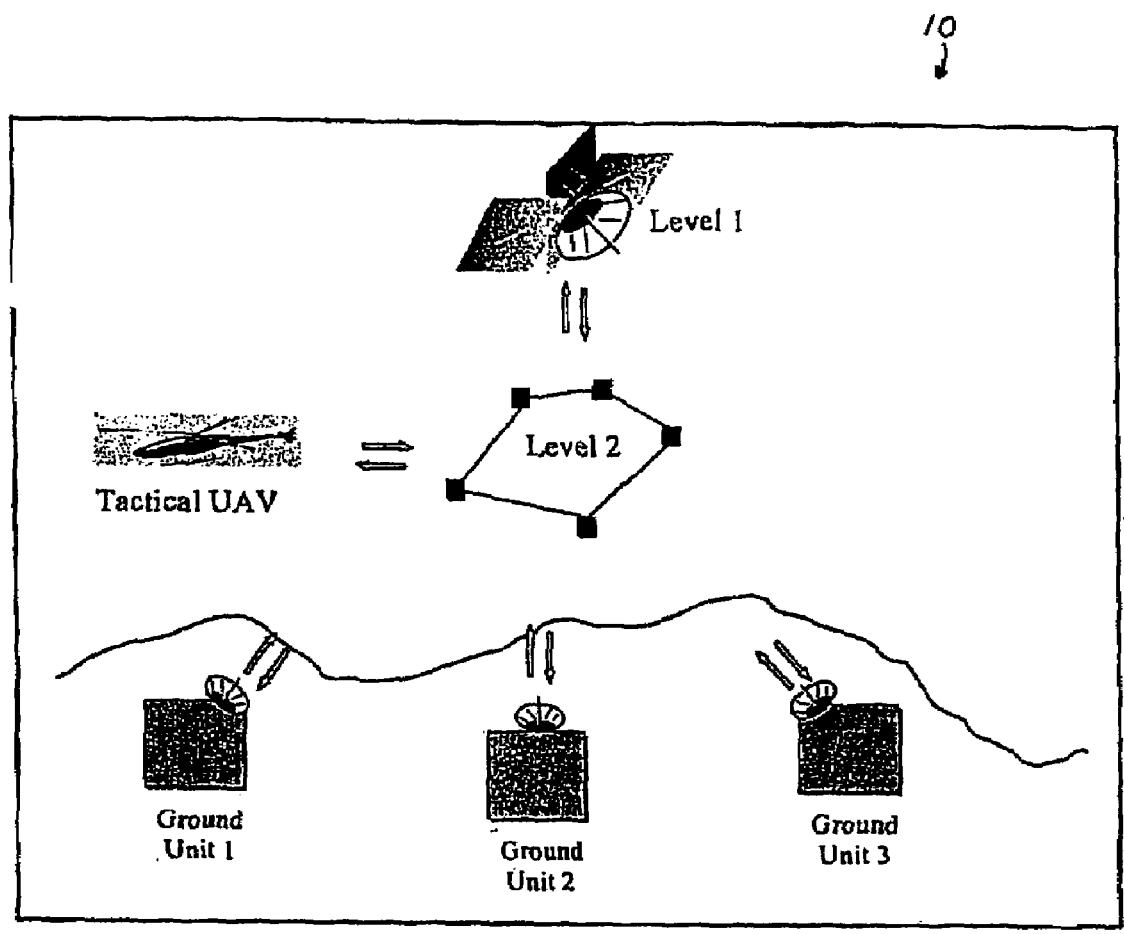
FIG. 1 illustrates a distributed network-centric communications system according to one aspect of the present invention.

The present invention introduces Radio Frequency-Photonic Integrated Communication (RF-PIC) building block modules. Such devices are particularly well suited for a distributed network-centric system. Referring now to FIG. 1, there is shown a network communications system 10 according to one aspect of the invention.

Figure 2:
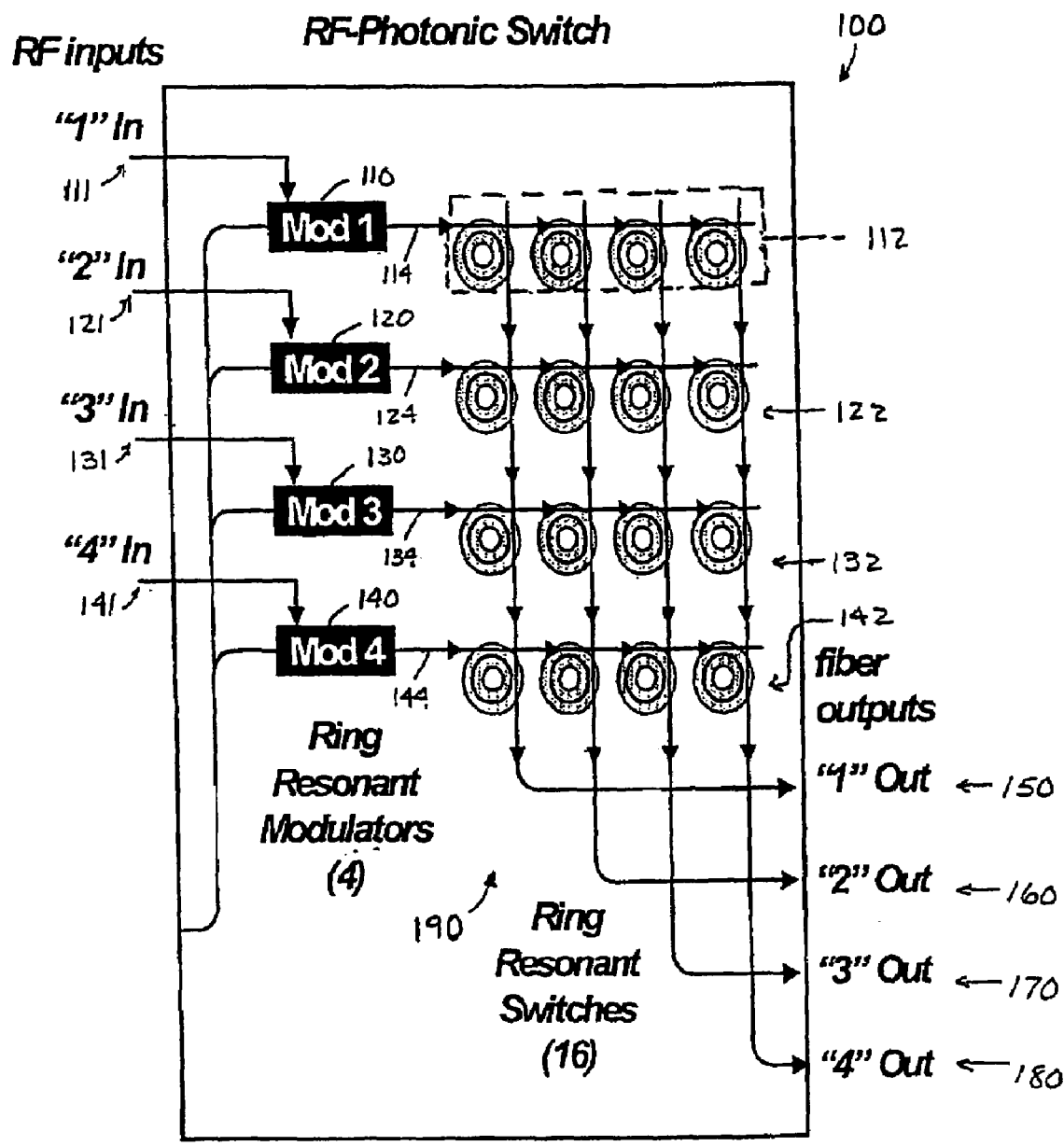
FIG. 2. illustrates an RF-photonics integrated communications module according to an aspect of the present invention.

Referring now to FIG. 2, there is shown an RF-photonics integrated communications module 100 according to an aspect of the present invention. Communications system incorporating such a module 100 can advantageously achieve ultra-low power per module, down-converting front ends for broadband operation, and fiber remoting and powering of large arrays. This further allows for multibeam steering from a single aperture and facilitates local oscillator distribution for signal processing.

Still referring to FIG. 2, the module 100 includes four groups of tunable, wavelength-selective, micro-resonant switches 112, 122, 132, 142 each being connected to a corresponding output of one of 4 RF modulators 110, 120, 130, 140 via a corresponding internal optical waveguide 114, 124, 134, 144.

The optical carriers modulated by those modulators are of distinct optical frequencies selected either externally to the module (in one embodiment), or by wavelength-selective properties inherent to the RF modulators (in a second, more general, embodiment). In the cases where the wavelength selective modulator properties are employed, multiple optical carriers may be supplied at inputs 1, 2, 3, 4. A special case of a source of such multiple carriers would be a mode-locked laser. Output optical waveguides 150, 160, 170, 180 are also provided. A 4×4 matrix of micro-ring resonators 190 is provided such that each couples one of the internal waveguides to one of the output waveguides. Coupling between crossing internal and output waveguides is accomplished by applying a voltage to a corresponding one of the ring resonators in the matrix 190, at the appropriate intersection thereof, thus transferring a selected portion of an input RF frequency spectrum to a crossing output waveguide. In this manner, signals from any of four RF inputs 111, 121, 131, 141 to the RF modulators 110, 120, 130, 140 can be modulated on any one of four optical wavelengths and steered towards any of the output waveguides 150, 160, 170, 180.

According to another aspect of the present invention, the modulator design employs a micro-ring design suitable for use for switching so as to provide wavelength selectable and tunable switching properties to enable noise figures under 1 dB. The pass bandwidth of the modulators can, in general, be varied by varying the optical propagation loss within the rings. According to yet another aspect of the present invention, the internal and output waveguides are perpendicular to one another, as shown in FIG. 2.

It should be recognized that this single component 100 is capable of switching, multi-casting, channelizing, frequency-shifting, or concentrating/stacking wideband analog signals. Further, multiple such components can be aggregated to obtain complex network topologies. Waveguides and ring resonators for both the modulators and the switches can be implemented in either a planar or a vertical coupling configuration. Deep etching can be used for the ring resonator structures to ensure low loss and maintenance of the definition of the mask edge.

For a switch array according to the present invention, to achieve X-band modulation bandwidths, the modulators 110, 120, 130, 140 (FIG. 2) must be of a sufficiently small size such that the photon lifetime, which $$\frac{\frac{nd}{c}}{1-R^2},$$

where n is refractive index, d is circumference, c is speed of light, and R is the power "reflectivity" of the couplers, is small compared to a period of the microwave frequency of modulation. For example, for R=0.95, n=3.2, and taking a factor of 10 margin, $d \leq 90$ μm is required, or ring diameters under 29 μm for the ring resonators of the matrix 190 (FIG. 2) must be used.

Figure 5:
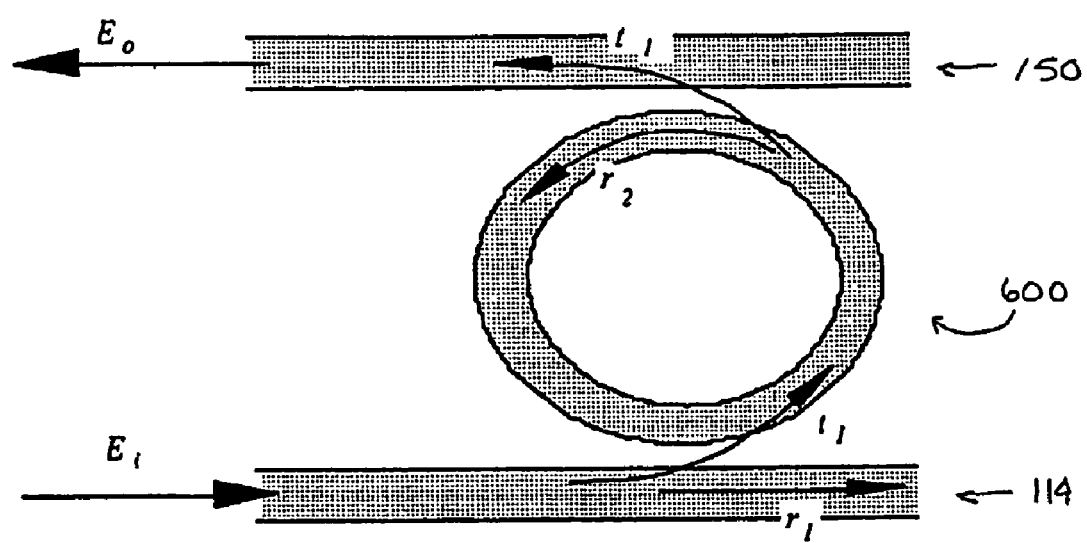

Referring now to FIG. 5, according to another aspect of the present invention the micro-rings of the matrix 190 (FIG. 2) are based on "racetrack" ring resonators (RRR) 600 coupled between the internal and output waveguides (FIG. 2). The configuration of FIG. 5 is also known as add-drop filter. The channels shown in FIG. 5, e.g. 114, 150, can be formed by etching the substrate to form the waveguides and the ring 600. Light $E_i$ propagating in one waveguiding channel, e.g. 114, can be coupled into the ring resonator 600 through evanescent mode coupling. It is then coupled from the ring resonator 600 to the other waveguide, e.g. 150, where it is now propagating in the direction shown by $E_o$. Since light propagating in the ring 600 has to constructively interfere with itself each time it completes a round trip, this process can occur only at specific resonant frequencies. The frequency selectivity of the coupling process has given it its name—channel dropping filter.

Figure 3:
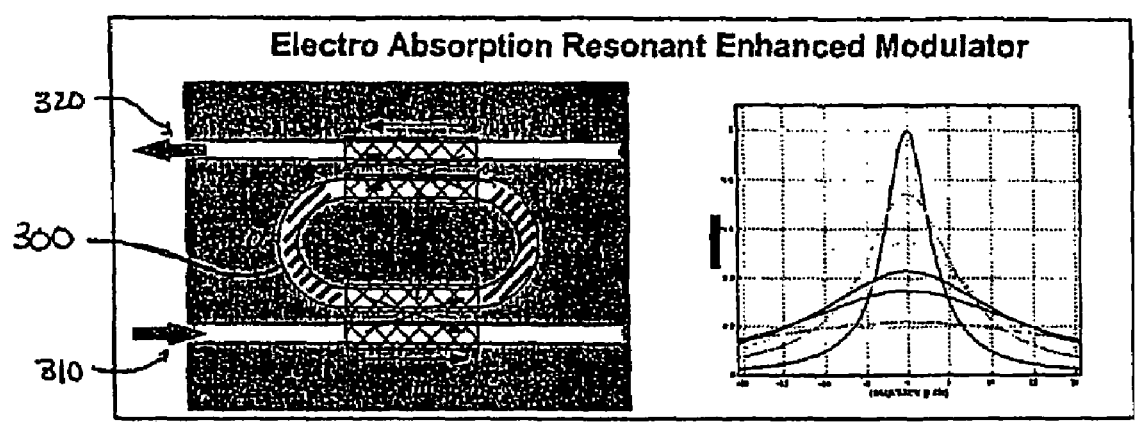
FIG. 3 illustrates a conventional electro-absorption resonant enhanced modulator and performance characteristics thereof suitable for use in connection with the present invention.

Referring now also to FIG. 3, switching between internal waveguides 114, 124, 134, 144 (FIG. 2) and output waveguides 150, 160, 170, 180 (FIG. 2) can be accomplished via the electro-absorption effect. In general the interaction and coupling between ring resonators 300, input waveguides 310 and output waveguides 320 are well known. Filtering with bandwidths of a few GHz, as required for channelization, places stringent requirements on the propagation loss and other losses of the ring, however suitable structures can be fabricated using controlled etching of InP-based materials by advanced dry etching techniques. According to another aspect of the present invention, the absorption constant α for the ring resonator is on the order of 0.2 cm$^{-1}$. The broadened waveguide is capable of achieving such losses in back-bias (in forward bias the active region is flooded with carriers Referring now also to FIG. 4, according to another aspect of the present invention, the RF-PIC modules according to the present invention are capable of switching, modulation and demonstrating waveguide splitting on a single InP chip. The 4×4 matrix 190 (FIG. 2) allows "slicing" of RF spectrum from a modulated carrier and combining the sliced spectrum with another carrier frequency, such as another optical frequency supplied by a different mode of a mode-locked laser, as will be understood by one possessing an ordinary skill in the pertinent art. The result is frequency translation.

Figure 4:
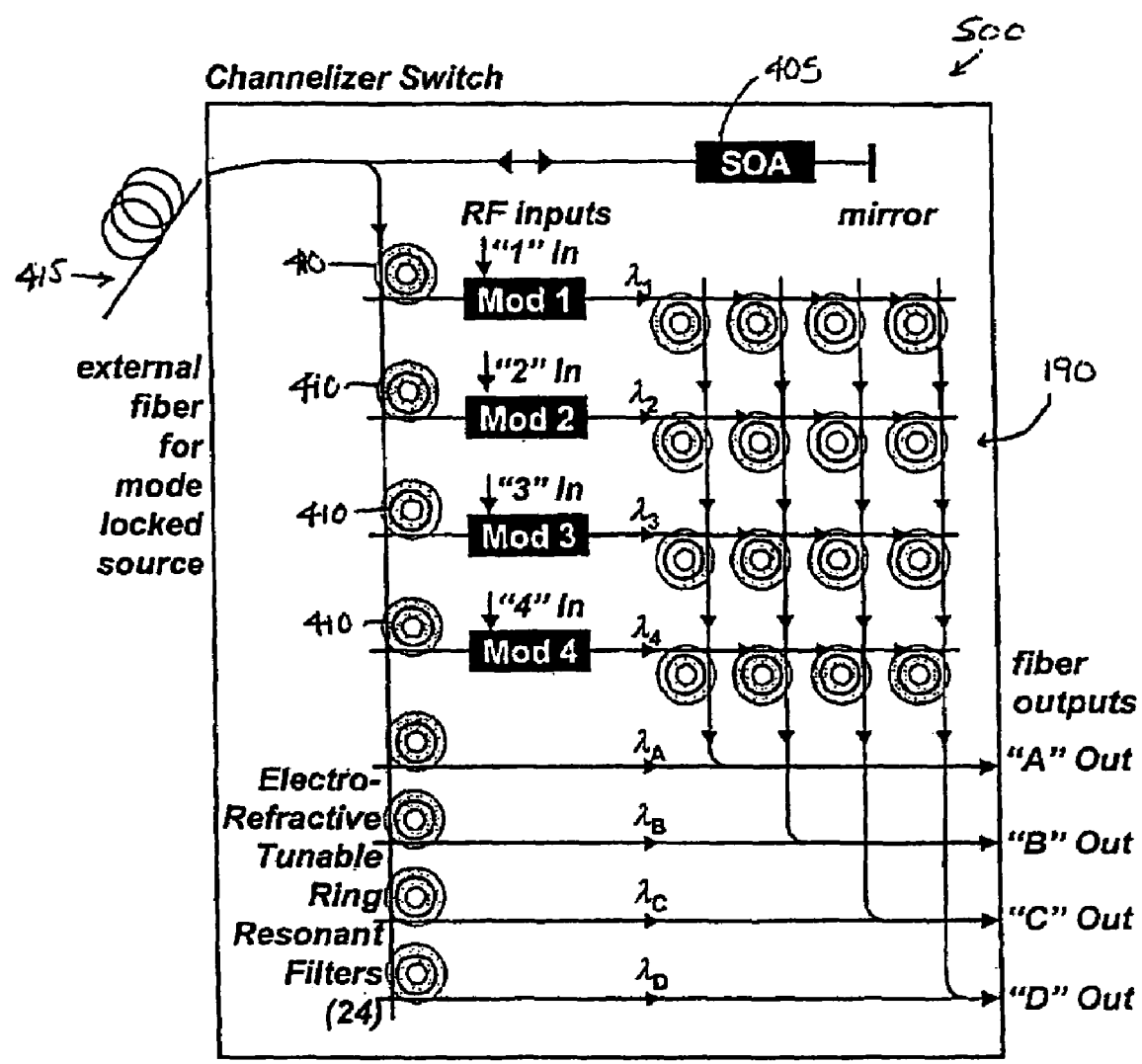
FIG. 4 illustrates an RF-photonic switch adapted for frequency translation and arbitrary levels of RF signal stacking according to an aspect of the present invention; and, FIG. 5 illustrates a ring resonator suitable for use in connection with the present invention.

Using this capability, true channelization may be accomplished, as well as frequency stacking. The RF-PIC module 500 shown in FIG. 4 is one implementation of this concept. The module 500 builds upon the structure of the module 100 shown in and discussed in connection with FIG. 2, hence like elements will not be again described.

In FIG. 4 has been added a multiwavelength source 405 in the form of a mode-locked source. The mode-locked source simultaneously emits many optical carriers and individual carriers can be selected using a frequency selective optical element, such as a micro-ring resonator filter. Accordingly FIG. 4 shows an embodiment providing additional functionality as compared to the basic switch matrix with modulators of FIG. 2.

In FIG. 4, each modulator is preceded in the path of the signal by a micro-ring resonator element 410 similar to that of the switch matrix 190. The purpose of this element is to select from the multi-wavelength source 405 represented by the mode-locked laser, itself comprised of an on-chip semiconductor optical amplifier (SOA) and an external cavity formed by an external fiber 415, a single wavelength to be associated with a single modulator. Accordingly, each RF input is associated with a single wavelength.

The purpose of the switch matrix 190 is to direct each RF input to the desired fiber output A, B, C, or D. Since it is possible that each RF input is modulated on a distinct optical carrier frequency (determined by the micro-ring resonator element preceding the modulator), it is also possible to combine all RF inputs to appear on a single fiber output. In this case the Channelizer Switch 500 might be considered to act as a concentrator. In this fashion however, the choice of the demodulation wavelength ($\lambda_A$, $\lambda_B$, $\lambda_C$, or $\lambda_D$,) would determine which RF input appears at or near baseband in a subsequent detection stage using an ordinary photodetector (not shown) which operates according to the "square-law" principle.

The demodulation signal is a very powerful feature of the Channelizer Switch. It enables the frequency conversion function, in combination with a square-law detector, which is only achievable owing to the fact that RF-subcarrier techniques are used.

In essence, the cw demodulation signal chooses the portion of the optical spectrum to detect in a bandwidth-limited detection scheme employing a square-law photodetector. This demodulation signal is simply combined with the modulated, switched, information-carrying, optical carrier by a waveguide combiner, and does not interact with the modulated carrier until both reach a photodetector. By selecting alternative optical wavelengths for the demodulation signal, differing portions of the RF spectrum become accessible to the bandwidth-limited square-law photodetector.

To explain the functioning of a channelizer, consider a wideband signal, spanning several optical carriers as defined by the mode-locked source, be employed to modulate an optical carrier. In that case, individual demodulation signals spaced in optical frequency more narrowly than the bandwidth of the input wideband signal, can be successively combined with the wideband signal, and subsequently detected with the bandwidth-limited square-law photodetector. Due to the limited bandwidth, noise is reduced in the channelization process and weaker signals can be extracted than would be possible analyzing the entire spectrum at once.

Most basically, the function of the 4×4 switch matrix is apparent though the use of the matrix to direct different RF-modulated optical carriers of differing wavelength to different fiber outputs. The demodulation signal for each fiber output is then chosen to match the wavelength of the signal switched to it, allowing each signal to be demodulated by an external square-law photodetector at or near baseband.

It is fundamental to the operation of the Channelizer Switch that an external bandwidth-limited square-law photodetection and RF amplification scheme is employed. Owing to the use of optical fiber it is possible to situate the photodetection module remotely from the Channelizer Switch.

According to other aspects of the present invention, at least two REM approaches can be used in connection with the matrix 190 (FIG. 2), the aforementioned electro-absorption and an electro refractive version (EA- and ER-REM). Device fabrication can be accomplished using photolithography and processes for etching InP-based waveguides and photon structures. Such etching techniques include dry etching techniques such as reactive ion etching (RIE), chemically assisted ion beam etching (CAIBE), and inductively coupled plasma reactive ion etching (ICP-RIE). Materials structures can be grown either by MBE, GSMBE, or OMCVD.

According to another aspect of the present invention, a configuration based on vertical coupling of the inter-connecting straight waveguide channels to the ring resonator in combination with deep etching of the ring resonators is used. The channels can be defined by chemically etching and subsequent regrowth of current blocking and planarization layers. The ring resonator is etched using reactive ion etching below the top guiding layer. In this way the two requirements, that of deep-etch definition of the ring resonators and fine control of the coupling strength with reasonable resolution features, are handled separately by the vertical and planar aspects of the structure. While maintaining high-Q value with deep etching all around the ring resonator, the coupling strength can be finely controlled by the thickness of the InP layer separating the top and the bottom waveguiding layers, along with the amount of overlap between the top and the bottom waveguides. In addition, creating an electrical junction at the top boundary of the lower waveguiding layer makes it possible to switch, i.e. selectively activate and deactivate, the resonator by changing the coupling strengths in the input and the output coupling regions.

According to yet another aspect of the present invention, fabricating the vertical structure described above can be accomplished using a two-step growth and etching procedure. Starting with n-type InP substrate, an n-type quaternary InGaAsP layer with higher refractive index is grown using metal-organic chemical vapor deposition (MOCVD). This layer serves as the core of the lower waveguide. On the top of this layer a thin p-type InP cap layer can continue to be grown. Interconnecting channels are now patterned using photolithography and chemical etching with nitride masking definition of the waveguides. Leaving the nitride mask, successive n-type and p-type layers are now grown to create current-blocking layers. The wafers are now planarized by removing the nitride masking and growing a thick p-type InP layer identical to the formerly grown cap layer. An additional quaternary layer can then be grown that serves as the core of the top waveguide and additional p-type InP cladding layer. The ring resonators are now defined by chemically assisted reactive ion beam etching (CAIBE). They are etched below the top quaternary layer and above the bottom one.

Growing the layers in the described manner forms a p-n junction in the upper boundary of the lower waveguiding layer. This advantageously enables injecting current or applying reverse voltage to control the loss or the refractive index of the lower waveguide. This, in turn, enables controlling the amount of coupling into and out of the ring resonators and therefore using them as active, switchable components. In addition, introducing quantum well layers within the lower waveguiding layer enables photon generation, and construction of various laser structure that utilize the dispersion characteristics of the ring resonators. In this way, monolithic photonic circuits that consist of switching elements alongside with active laser structures can be advantageously provided.

The present invention can find utility in a number of areas, including frequency shifting, channelization (separation of a high bandwidth signal into low bandwidth channels more amenable to data acquisition), channel stacking (permitting multiple RF channels to be carried over a single optical path, separated by heterodyne methods at the receive end), and switching. Channelization, as used herein is the opposite of channel stacking, whereas switching is intermediate in that it neither fans-out nor concentrates RF signal flow. Thus, these three are all related functionalities.

The photonic switch disclosed herein is capable of a variety of functions. If a specific wavelength is assigned as an address to a particular unit, then light from a multiplicity of lasers at systems Levels 1 or 2 (FIG. 1), such as a multi-wavelength mode-locked laser, can be modulated with wavelength-specific data, which are then channeled or switched to address the specific units. The same switch, located in each unit, can be configured to receive only signals intended for each particular unit. For the purpose of security, wavelengths can be dynamically reallocated to any unit. Transmission can be through RF microwave or optical links. Thus, the disclosed RF photonic module can be dynamically configured for communications from high level systems to all units (anycasting) or any specific unit (time-space multicasting), as well as transmission of signals among units via the high level systems. The present invention is also well suited for creating tunable filters of approximately 1 to 5 GHz bandwidth.

It should be recognized that the integrated RF-PIC module according to the present invention, combining wavelength-specific broadband RF micro-optical modulators with low-voltage modulation, routing switches, and waveguide splitters with the capability to arbitrarily channelize broadband data from any input channel to any output channel—using a single waveguide input if desired—will impact numerous application areas beyond that limited solely to FCS communications. These integrated components permit low-noise remoting of RF signals in a variety of applications, including communications, navigation, electronic warfare, and in other applications such as photonic A/D converters (which include high performance links).

Further, introduction of this practical micro-optical device technology has very broad implications for the future of RF-optical signal distribution, switching, and analog network applications. For example, RF channelization systems can be substantially miniaturized from the current multi-relay-rack size to a small breadbox module using ring resonator filter technology integrated and switched on-chip. Also, transversal filtering can be implemented optically in extremely compact form, with flexibility of reconfiguration to match needed spectral responses for avoidance of enemy jamming signals and for spread-spectrum low probability of intercept communications and imagery.

Finally, the present invention enables digital switching applications suited to the exploding commercial market and its dramatically increase data traffic. The key advantage of the micro-optical resonators being the ability to concentrate a very large number of switch and modulator elements in array fashion with low power consumption and very low loss per element. For large crossbar digital switch array applications, it is likely that loss will be mitigated by incorporation of modest amounts of gain, and (with this innovation) large-scale switches can be constructed. Issues relating to the digital technology are closely similar to those needed to optimize the low voltage modulator, such as arraying, cascading, optical loss, packaging, fabrication, testing and design of micro-optical waveguide components—including mode expanders, resonator, directional couplers and other key building block components.

One important military application for the present invention is wideband distribution of analog EW signals within an airframe. Other important military and commercial applications include distribution and switching of RF microcell communications signals, frequency conversion links, and implementation of wavelength-independent true-time-delay for phase array antennas. A basic RF-photonic building block appropriate for such multiple applications is essential in enabling the realization of the advantages offered by RF-photonics in size, weight, and power.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

I claim:

1. An RF-photonics integrated communications module comprising:
    a plurality of RF input channels;
    a plurality of modulators each being responsive to one of said RF input channels; and,
    a plurality of photonic output channels coupled to said modulators via
    a plurality of ring resonators to selectively apply outputs of said modulators to said output channels.

2. The module of claim 1, wherein said ring resonators are coupled in a matrix fashion between said modulators and said outputs.

3. The module of claim 1, further comprising an optical signal input for receiving an optical input signal and being coupled to each of said modulators such that said modulators modulate said optical input signal in response to said RF inputs, respectively.

4. The module of claim 1, wherein each of said ring resonators is elongated.

5. The module of claim 3, further comprising a plurality of resonant elements coupled between said optical input and modulators for selectively applying portions of said optical input signal to said modulators.

6. The module of claim 5, further comprising an amplifier coupled to said optical input.

7. The module of claim 6, wherein said amplifier comprises a semiconductor optical amplifier.

8. The module of claim 5, wherein said plurality of resonant elements exhibit electro-refractive properties.

9. The module of claim 8, wherein each of said plurality of resonant elements comprises a ring resonator.

* * * * *